F. A. LYON.
DRAFT EQUALIZER.
APPLICATION FILED FEB. 11, 1918.
1,308,525.
Patented July 1, 1919.
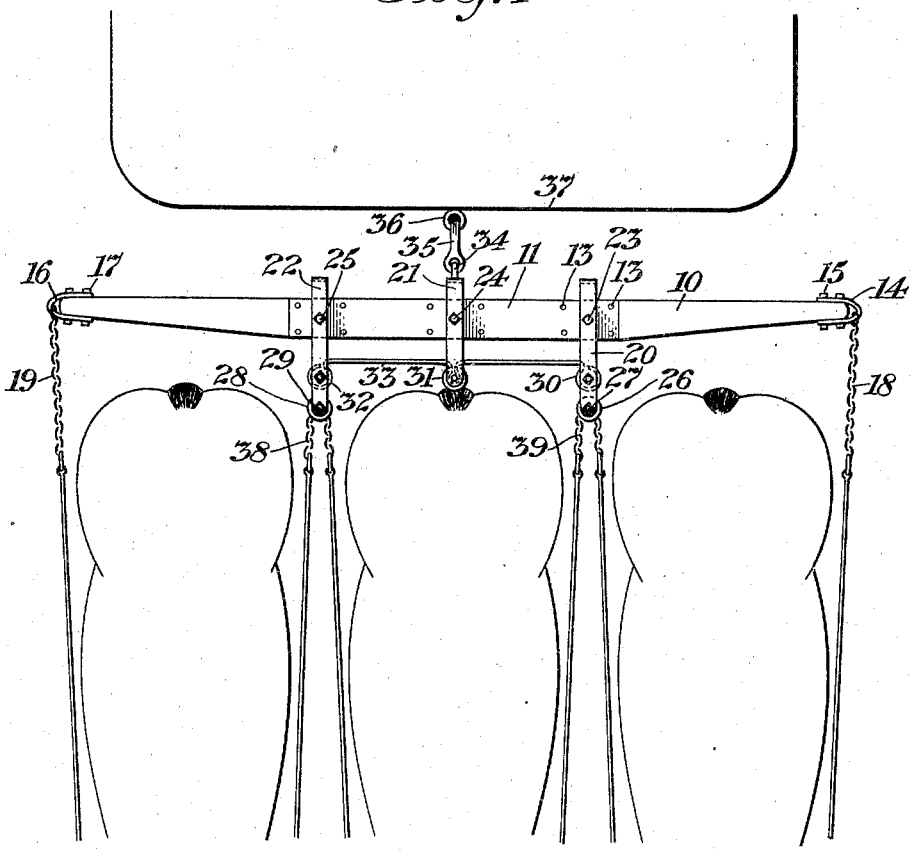
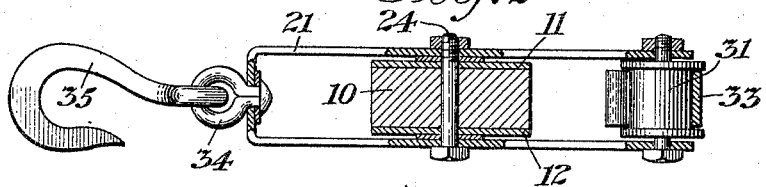
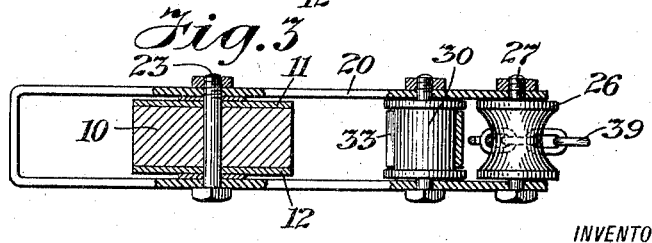
WITNESS
Chas. F. Clagett
INVENTOR
Frank A. Lyon
BY
Serrell Son
HIS ATTORNEYS

UNITED STATES PATENT OFFICE.

FRANK A. LYON, OF MILFORD, NEW YORK.

DRAFT-EQUALIZER.

1,308,525.  Specification of Letters Patent.  Patented July 1, 1919.

Application filed February 11, 1918. Serial No. 216,433.

*To all whom it may concern:*

Be it known that I, FRANK A. LYON, a citizen of the United States, residing at Milford, in the county of Otsego, and the State of New York, have invented an Improvement in Draft-Equalizers, of which the following is a specification.

My present invention relates to a whiffletree and more particularly to a whiffletree adapted for use with three horse teams, with the object of so constructing the apparatus that the draft of the animals will be equalized. In carrying out my invention I preferably employ a cross bar, a plurality of U-shaped straps pivotally connected in spaced positions to the said cross bar and extending beyond the edges of the same on both sides thereof, a connection from the central U-shaped strap to the vehicle or other load to be hauled, and means for pivotally connecting the U-shaped straps so that they will swing or move in unison and remain parallel to one another in all positions, as well as devices for connection with the traces forming part of the harness by which the animals employed draw the vehicle or other load to be hauled, as will be hereinafter more particularly described.

In the drawing:

Figure 1 is a plan view of my improved whiffletree showing diagrammatically the animals as well as a portion of a vehicle.

Fig. 2 is an enlarged longitudinal section of the central U-shaped strap and parts associated therewith, and Fig. 3 is a view similar to Fig. 2 illustrating one of the outer U-shaped straps.

Referring particularly to the drawing it will be seen that in carrying out this invention I employ a cross bar 10 which may be made of wood or any other suitable material. Centrally in the opposite faces of this cross bar metal plates are preferably set. The top plate is indicated at 11 and the bottom plate at 12, and these plates are secured to position by means of bolts 13 or otherwise. At one end thereof the cross bar 10 is provided with a clevis 14 secured in position by bolts 15 or otherwise, while similarly at the opposite end thereof the cross bar 10 is provided with a clevis 16 secured in position by bolts 17. A chain 18 is connected at one end in the clevis 14 and adapted at its opposite end to be connected with a trace forming part of the harness. Likewise at the opposite end of the cross bar there is a chain 19 secured at one end in the clevis 16 and adapted at its opposite end to be connected to a trace forming another part of the harness.

As hereinbefore stated, I also employ a plurality of U-shaped straps. These as indicated are three in number and are designated at 20, 21 and 22. The U-shaped strap 21 is pivotally connected to a cross bar 10 by means of a bolt 24 or otherwise, and this U-shaped strap is connected to the cross bar centrally thereof. The U-shaped strap 20 is pivotally connected to the cross bar by a bolt 23 also passing through the cross bar and through the plates 11 and 12 at a predetermined distance from the bolt 24. In a like manner the U-shaped strap 22 is pivotally connected to the cross bar by a bolt 25 which passes through the cross bar and the plates 11 and 12 at the same distance from the bolt 24 as is the bolt 23. The outer U-shaped straps 20 and 22 are therefore equally placed from the central U-shaped strap 21. These U-shaped straps are pivotally connected to the cross bar in such positions that the yoke ends thereof are spaced appreciably from one side of the cross bar. At the other side of the cross bar the U-shaped strap 20 is fitted at its other end with a roller 26 which is secured in position therein by means of a bolt 27 or otherwise, and similarly the other outer U-shaped strap 22 at the corresponding end is fitted with a roller 28 secured therein by a bolt 29 or otherwise. In the U-shaped strap 20 adjacent the roller 26 there is also secured therein a spool indicated at 30. In the corresponding end of the central U-shaped strap 21 there is a similar spool 31 and in the U-shaped strap 22 there is also a corresponding spool 32. These spools may be connected in the respective straps with which they are associated by bolts or in any other suitable manner. Connecting and extending between the spools 30, 31 and 32 is a link 33. At its ends this link is turned to fit the spools 30 and 32, while centrally it is turned to fit around the spool 31 so as to maintain the U-shaped straps in a fixed relationship to one another, permitting them to swing and causing them to maintain a position which is always parallel.

At the yoke end of the U-shaped strap 21 an eye 34 is secured and provided with a hook 35 adapted to be connected with an eye 36 secured to a vehicle diagrammatically indicated at 37 or to any other load, which as will be understood is to be hauled.

In order to advantageously connect the traces forming part of the harness to the apparatus hereinbfore described and in such a way as to equalize the draft by coöperation with the other parts of the whiffletree, I employ a chain 38 passing over the roller 28 and adapted at its ends to be connected to the traces of the harness of adjacent animals, and similarly passing over the roller 26 is a chain 39, adapted to be connected to other traces of adjacent animals. In the operation of the hereinbefore described device due to the fact that the chains 38 and 39 are permitted to slide on the rollers over which they pass, as well as the fact that the U-shaped straps are connected so as to move in unison, the draft of the vehicle or load to be hauled will be equalized between the animals employed.

I claim as my invention:

1. A whiffletree comprising a cross bar, a plurality of straps placed transversely of the cross bar extending appreciable distances beyond the sides thereof and pivotally connected thereto, means for connecting one of said straps to the load to be drawn, and means for pivotally connecting all of the said straps to each other at the draft ends thereof.

2. A whiffletree comprising a cross bar, a U-shaped strap pivotally connected to the cross bar centrally thereof, and means for connecting said U-shaped strap to a load to be drawn, outer U-shaped straps also pivotally connected to a cross bar at equal distances from the pivotal connection of the aforesaid U-shaped strap, and means for pivotally connecting the said U-shaped straps to one another.

3. A whiffletree comprising a cross bar, three U-shaped straps pivotally connected thereto in spaced positions with the corresponding yoke ends of the U-shaped straps extending an appreciable distance beyond one edge of the cross bar and the other ends of the U-shaped straps extending an appreciable distance beyond the other edge of the cross bar, means for connecting the yoke end of the central U-shaped strap to a load to be drawn, a spool mounted in the opposite end of each of the U-shaped straps, and a link pivotally connected to each of the said spools for securing the U-shaped straps together and maintaining the same in parallel positions.

4. A whiffletree comprising a cross bar, three U-shaped straps pivotally connected thereto in spaced positions with the corresponding yoke ends of the U-shaped straps extending an appreciable distance beyond one edge of the cross bar and the other ends of the U-shaped straps extending an appreciable distance beyond the other edge of the cross bar, means for connecting the yoke end of the central U-shaped strap to a load to be drawn, a spool mounted in the opposite end of each of the U-shaped straps, a link pivotally connected to each of the said spools for securing the U-shaped straps together and maintaining the same in parallel positions, rollers mounted in the ends of the outer U-shaped straps adjacent the said spools, and chains passing over the said rollers.

Signed by me this 2nd day of Feb. 1918.

FRANK A. LYON.